United States Patent [19]

Shiomi

[11] Patent Number: 4,615,616
[45] Date of Patent: Oct. 7, 1986

[54] MEASURING DISTANCE APPARATUS

[75] Inventor: Yasuhiko Shiomi, Tokyo, Japan

[73] Assignee: Canon Kabushiki Kaisha, Tokyo, Japan

[21] Appl. No.: 658,789

[22] Filed: Oct. 9, 1984

[30] Foreign Application Priority Data

Oct. 14, 1983 [JP] Japan .............................. 58-192083

[51] Int. Cl.⁴ .......................... G03C 3/10; G03B 3/00
[52] U.S. Cl. ........................................ 356/1; 354/403
[58] Field of Search .............................. 354/403; 356/1

[56] References Cited

U.S. PATENT DOCUMENTS

| | | | |
|---|---|---|---|
| 4,288,152 | 9/1981 | Matsuda | 354/25 |
| 4,436,418 | 3/1984 | Morino | 354/403 |
| 4,441,810 | 4/1984 | Momose et al. | 354/403 |
| 4,534,636 | 8/1985 | Sugawara | 354/403 |
| 4,542,971 | 9/1985 | Numata | 354/403 |
| 4,571,048 | 2/1986 | Sugawara | 354/403 |

FOREIGN PATENT DOCUMENTS 0044809  3/1983  Japan .

*Primary Examiner*—Russell E. Adams

*Attorney, Agent, or Firm*—Fitzpatrick, Cella, Harper & Scinto

[57] ABSTRACT

A measuring distance apparatus for measuring a distance to an object in accordance with an incident position of a reflected light of a signal light projected to the object is disclosed. It comprises photosensing means for sensing the signal light having a plurality of photo-electric converters each having a first electrode connected to a first range of potential and a second electrode connected to the second electrode of other photo-electric converter by a resistive wire, means for connecting at least one point on the resistive wire to a second range of potential which is different from the first range of potential by a conductive wire having a lower resistance than the resistance of the resistive wire, switching means for connecting and disconnecting the conductive wire, and detection means connected to the resistive wire at a point farther from or closer to the incident point of the signal light varying with a distance to the object from a point on the resistive wire to which the conductive wire is connected, for detecting an output status at that point. The incident position of the signal light is detected from a change of the output status of the resistive wire connected to the detection means so that the distance to the object is detected.

10 Claims, 5 Drawing Figures

MEASURING DISTANCE APPARATUS

BACKGROUND OF THE INVENTION

1. Field of the Invention

The present invention relates to a measuring distance apparatus for use with a camera, which projects a light to an object and receives a light reflected therefrom to determine a distance to the object.

2. Description of the Prior Art

In prior art so-called active range finder, an incident position of a reflected light of a signal light to a photosensor is detected and distance information is derived by correlating the incident position to a distance to an object in accordance with a principle of triangulation. This method is disclosed in Japanese Patent Application Laid-Open No. 44809/1982 which uses a semiconductor position detector as the photosensor and in U.S. Pat. No. 4,288,152 which uses an array of photodiodes as the photosensor. In those prior art devices, However, a signal processing circuit for amplifying and processing an output of the photosensor is provided for each output of the photosensor. Accordingly, two or more channels of signal processing circuits are required and hence a large scale of circuit is needed. In the device which uses the semiconductor position detector as the photosensor, the signal processing circuits are provided one for each of the two outputs, and in the device which uses the array of photodiodes, the signal processing circuits are provided one for each of the outputs of the photodiodes.

SUMMARY OF THE INVENTION

It is an object of the present invention to resolve the problem encountered in the prior art device and provide a range finder which determines a distance to an object in accordance with an incident position of a light reflected from the object illuminated by a signal light. The present measuring distance apparatus comprises photosensing means for sensing the signal light having a plurality of photo-electric converters each having a first electrode connected to a first range of potential and a second electrode connected to the second electrode of other photo-electric converter by a resistive wire, means for connecting at least one point on the resistive wire to a second range of potential which is different from the first range of potential by a conductive wire having a lower resistance than the resistance of the resistive wire, switching means for connecting and disconnecting the conductive wire, and detection means connected to the resistive wire at a point farther from or closer to the incident point of the signal light varying with a distance to the object from a point on the resistive wire to which the conductive wire is connected, for detecting an output status at that point. The incident position of the signal light is detected from a change of the output status of the resistive wire connected to the detection means caused by the switching of the switching means so that the incident position can be detected by one channel of detection means for processing the output of the photosensing means. Thus, a circuit scale of the range finder for measuring the distance to the object in accordance with the receiving position of the signal light is reduced.

It is another object of the present invention to provide a measuring distance apparatus having a simple circuit constraction for digitally discriminating distance information.

Other objects of the present invention will be apparent from the preferred embodiments of the invention described below.

DETAILED DESCRIPTION OF THE PREFERRED EMBODIMENTS

The preferred embodiments of the invention will now be explained with reference to the drawings.

Figure 1:
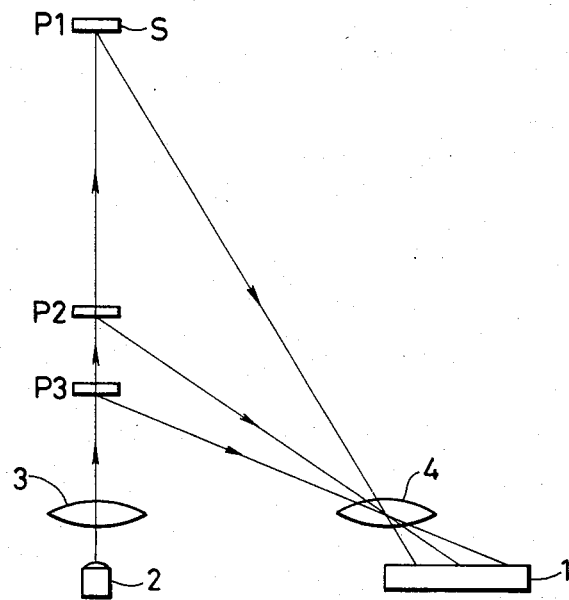
FIGS. 1 and 2 are diagrams illustrating a principle of a range finder of the present invention.

Referring to FIG. 1, a photosensor 1 represents a semiconductor position sensitive detector (PSD) having a longitudinally extending PIN structure photodiode in a photosensing plane and a high resistance layer in a surface. A signal light emitted from a light emitting element 2 is transmitted through a projection lens 3, reflected by an object S and directed to the photosensor 1 through a lens 4. An incident position to the photosensor 1 varies in accordance with a position P1, P2 or P3 of the object 1, and a distance to the object is determined by detecting the incident position.

Figure 2:
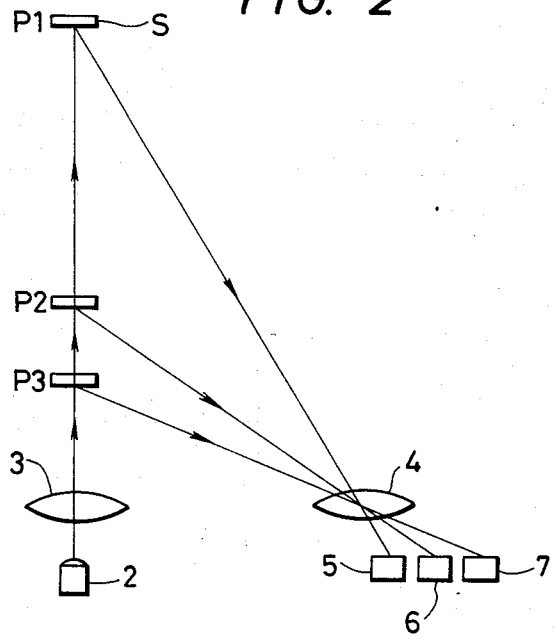

In FIG. 2, the photosensor comprises three photodiodes 5, 6 and 7. The reflected light of the object S reflected at a position P1 is directed to the photosensor 5, the reflected light of the object S reflected at a position P2 is directed to the photosensor 6 and the reflected light of the object S reflected at a position P3 is directed to the photosensor 7. A distance to the object is measured by detecting the photosensor to which the reflected light is directed.

Figure 3:
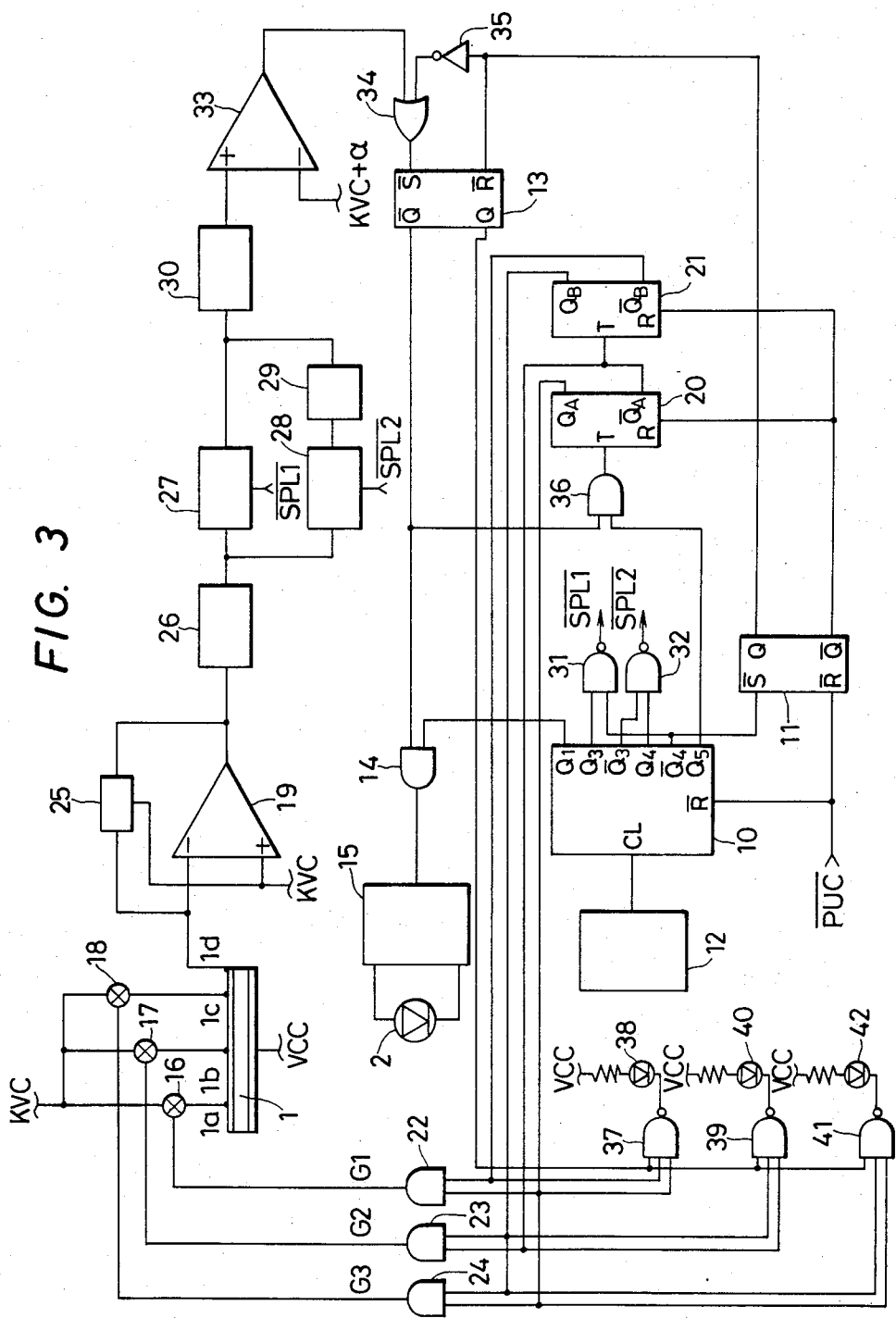
FIGS. 3 and 5 show processing circuit diagrams of the range finder corresponding to FIGS. 1 and 2, respectively.
Figure 4:
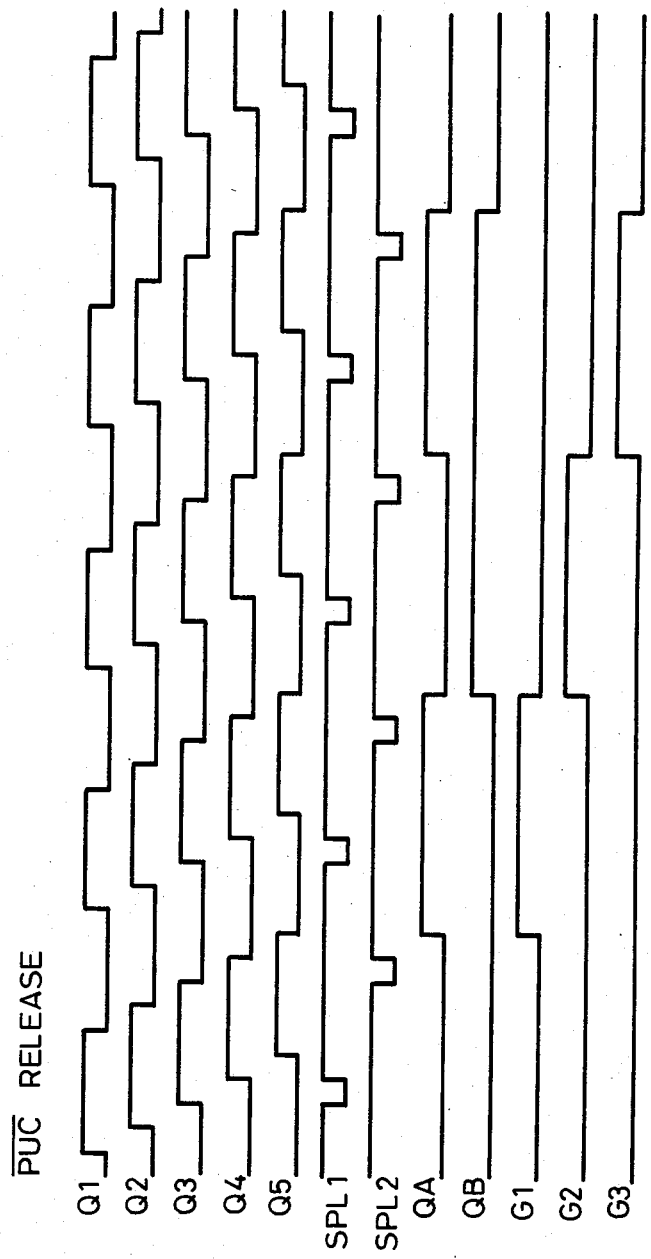
FIG. 4 is a timing chart of signals used in the processing circuits of FIGS. 3 and 5.

FIG. 3 shows a circuit diagram for an embodiment which uses the photosensor 1 shown in FIG. 1. A Johnson counter 10 and an RS flip-flop 11 are reset by an initial pulse signal $\overline{PVC}$. An output of a reference clock generator 12 is applied to the Johnson counter 10 which frequency-divides it to produce outputs at Q1, Q2, Q3, Q4 and Q5 at a timing shown in FIG. 4. Since the RS flip-flop 11 is in its reset state, an RS flip-flop 13 is also in its reset state and a $\overline{Q}$ output thereof is in a High level state (hereinafter called H).

When the Q1 output of the Johnson counter 10 changes to H, an output of an AND gate 14 changes to H which in turn is transmitted to a light emitting device driver 15 so that a light emitting device 2 is fired at a predetermined period. The signal light from the light emitting device 2 is reflected by the object S and directed to the photosensor 1 as shown in FIG. 1. The photosensor 1 has four electrodes 1a, 1b, 1c and 1d. Three control electrodes 1a, 1b and 1c are connected to a low impedance, low reference voltage source KVC through analog switches 16, 17 and 18, respectively, and the discrimination electrode 1d is connected to an inverting input terminal of an operation amplifier 19. So long as an RS flip-flop 11 is in a reset state, T flip-flops 20 and 21 are reset and outputs of AND gates 22, 23 and 24 are in their low level states (hereinafter called L) so that the analog switches 16, 17 and 18 are open.

Under this condition, the photo-current generated in the photosensor 1 has no path to flow and flows into the operational amplifier 19 through a surface of the photosensor 1 which is now a high resistance layer. Only the photo-current due to the reflected light of the signal light is converted to a voltage through a bypass filter of a feedback circuit 25. The output of the operational amplifier 19 is amplified by an amplifier 26 through an AC coupling (not shown). A negative level and a positive level of the output of the amplifier 26 are sampled by sample/hold circuits 27 and 28 at a timing of signals SPL1 and SPL2 shown in FIG. 4, and the output of the sample/hold circuit 28 is inverted by an inverter 29 and the output of the inverter 29 and the output of the sample/hold circuit 27 are summed by an adder 30. The signals SPL1 and SPL2 are produced by NAND gates 31 and 32, respectively, based on the Q3, Q4, Q3 and Q4 outputs of the Johnson counter 10. When the signal output from the photosensor is detected, the output of the adder 30 is higher than KVC+α where the KVC is the reference voltage applied to a negative input terminal of a comparator 33.

If the output of the adder 30 does not rapidly rise from the low reference voltage KVC by a delay in a response to a signal, the output of the comparator 33 is L and hence the output of the RS flip-flop 13 is unstable. In order to prevent this, the RS flip-flop 13 is constructed to be preferentially reset through an OR gate 34 and an inverter 35 is both $\overline{R}$ and $\overline{S}$ are reset. T flip-flops 20 and 21 constitute a binary counter for frequency-dividing the Q5 output of the Johnson counter 10, and outputs G1, G2 and G3 of AND gates 22, 23 and 24 sequentially assume H at a timing shown in FIG. 4.

As shown in FIG. 1, when the object S is at a for distance, that is, at the point P1, the reflected light is directed on the left of the electrode 1a of the photosensor 1 and a photo-current is generated at that position. When the analog switches 16, 17 and 18 are open, the entire current flows into the operational amplifier 19 as described above. When the output G1 assumes H and the switch 16 is closed, the generated current flows to the electrode 1a through the surface of the photosensor 1 of the high resistance layer, but when the current reaches the electrode 1a, the entire current flows to the low inpedance, low reference voltage source KVC through the switch 16 and does not flow into the operational amplifier 19 because of the high resistance layer of the surface of the photosensor 1.

When the current generated in the photosensor stops to flow into the signal processing circuit including the operational amplifier 19, the output of the adder 30 is lowered below the level KVC+α (α>0) of the reference voltage applied to the negative input terminal of the comparator 33 so that the output of the comparator 33 assumes L. By the change of the output of the comparator 33, the RS flip-flop 13 is set and the outputs of the AND gates 14 and 36 assume L so that the light emitting device 2 is turned off, the outputs of the T flip-flops 20 and 21 maintain the current status and further count-up is stopped. Since the RS flip-flop 13 is set, the output of the NAND gate 37 assumes L and only the lamp 38 which indicates the far distance is turned on.

When the reflected light is reflected by the object S at the position P2 and directed to a space between the electrodes 1a and 1b of the photosensor 1, the switch 16 is first closed after the initial pulse signal $\overline{PUC}$. In the case, the path between the incident position of the reflected light and the electrode 1a at which the switch 16 is located is high resistance surface, the distance therebetween is substantially equal to a distance to the electrode 1d connected to the negative input terminal of the operational amplifier 19, a signal current which is inversely proportional to the ratio of those distances flows into the feedback current 25, the output of the adder 30 increases above the reference voltage KVC+α and the output of the comparator 33 remains H. If the analog switch 17 is then closed, the entire generated current flows through the analog switch 17 in the same manner as the current flew through the switch 16 when the reflected light was directed to the left of the electrode 1a so that the signal current flowing into the electrode 1d is essentially zero and the output of the adder 30 assumes KVC. Accordingly, the output of the comparator 33 is inverted to L, the light emitting device 2 is turned off, the counting-up by the T flip-flops 20 and 21 is stopped, the output of the NAND gate 39 assumes L and the lamp 40 indicating the intermediate distance is turned on. When the object S is at the position P3, the incident position of the signal light is between the electrodes 1b and 1c. Thus, by sequentially closing the switches, the near distance is indicated by the lamp 42 through the NAND gate 41.

In this manner, by sequentially closing the analog switches 16, 17 and 18 provided for the control electrodes 1a, 1b and 1c, the distance information of the object S can be determined by only one signal processing cirucit which processes the output of the electrode 1d of the photosensor 1. Since the distance information is a digital signal, no complex analog-to-digital conversion for the external display is necessary and the signal processing circuit can be simplified.

Figure 5:
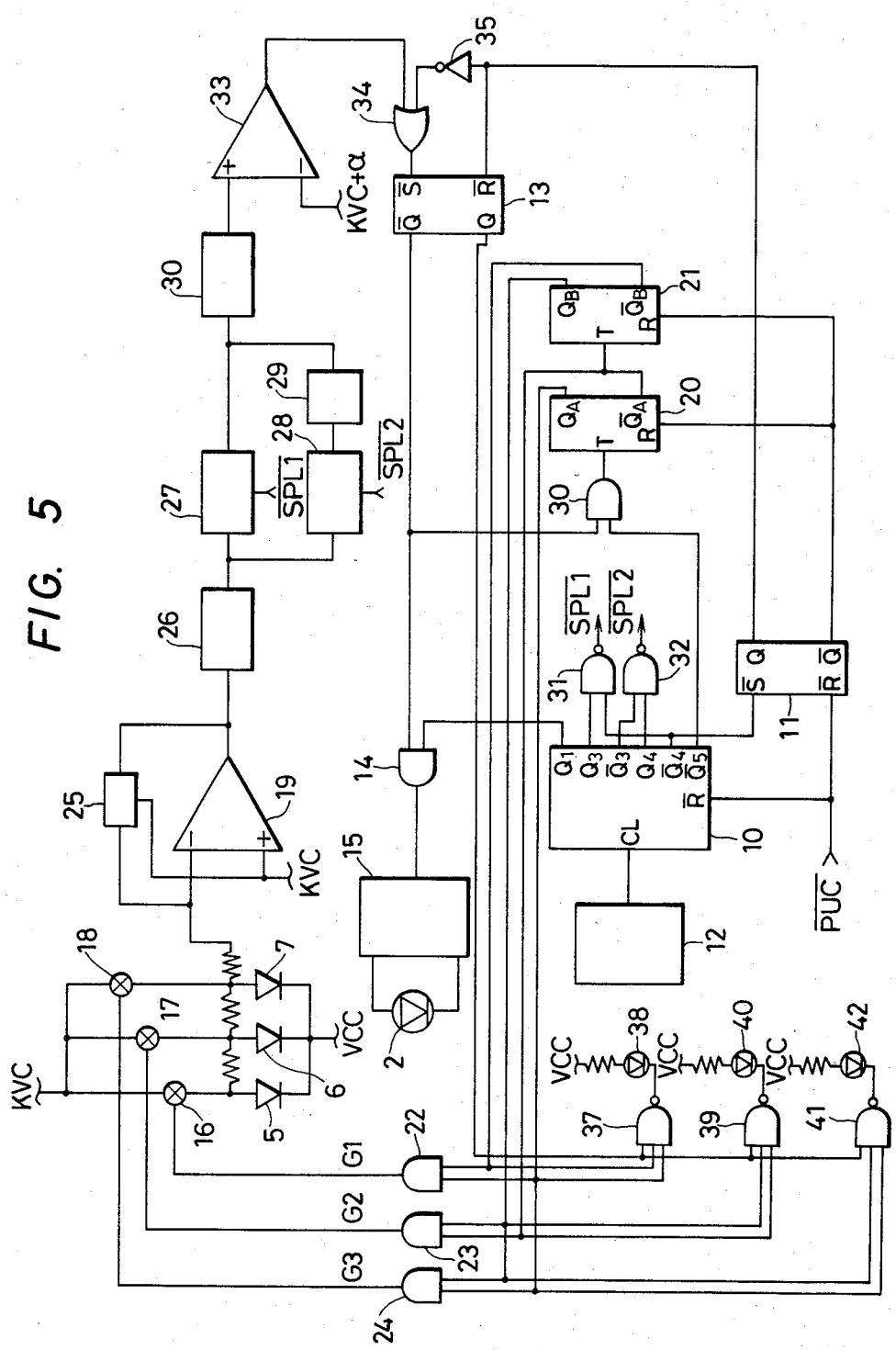

FIG. 5 shows an embodiment which uses the three photodiodes 5, 6 and 7 shown in FIG. 2 as the photosensor. The photosensors 5, 6 and 7 have their cathodes connected to a common high reference potential VCC and have their anodes connected to a low inpedance, low reference potential KVC through analog switches 16, 17 and 18, respectively and have adjacent anodes interconnected through high resistors. The distance information can be obtained by using a signal processing circuit similar to that shown in FIG. 3.

In the present embodiment, the distance is divided by the three points. By increasing the numbers of the electrodes and the photosensors, the distance can be measured with a higher resolution.

In the present embodiment, the lamp 38, 40 or 42 is turned on to indicate the distance. However, the distance indication may be effected by other display such as a liquid crystal or an imaging lens may be driven into an in-focus position in accordance with the distance indication signal.

Further, in the present embodiment, each of the high reference potential VCC and the low reference potential KVC is a single reference potential, however, if there are provided potential difference between the high reference potential VCC and the low reference potential KVC, their terminals connected to a single reference potential is possible to be respectively connected different reference potentials or, the relationship between the reference potentials is possible to be reversed in level by reversing the direction of the connection of the photosensor.

As described hereinabove, the measuring distance apparatus of the present invention measures the distance based on the incident position of the signal light impinging to the photosensor by processing the output of the photosensor by the single signal processing circuit. Accordingly, the circuit scale is significantly reduced.

What I claim is:

1. A measuring distance apparatus for measuring a distance to an object in accordance with an incident position of a reflected light of a signal light projected to the object, comprising:
   (A) projection means for projecting the signal light;
   (B) photosensor means for sensing the reflected light of said signal light, including
      (a) a plurality of photoelectric converters having first electrodes thereof connected to a first range of potential, and
      (b) a resistive wire for interconnecting second electrodes of said photoelectric converters;
   (C) a conductive wire for connecting at least one portion of said resistive wire to a second range of potential different from said first range of potential; said conductive wire having a lower resistance than that of said resistive wire,
   (D) switching means for connecting and disconnecting said conductive wire; and
   (E) detection means connected to said resistive wire at a farther or nearer point than an incident position of a signal light varying with the distance to said object, from the point of said resistive wire to which said conductive wire is connected, for detecting an output status at said point,
   said detection means detecting the incident position of said signal light from a change of the output status due to the switching of said switching means.

2. A measuring distance apparatus according to claim 1 wherein said photosensing means includes a position sensitive detector.

3. A measuring distance apparatus according to claim 1 wherein said photoelectric converters each include photodiodes.

4. A measuring distance apparatus according to claim 1 wherein said first range of potential is higher than said second range of potential.

5. A measuring distance apparatus according to claim 1 wherein said conductive wire is connected to said resistive wire at the number of points corresponding to a distance resolution in accordance with a direction of movement of the incident position of the signal light varying with the distance to the object.

6. A measuring distance apparatus according to claim 1 wherein said detection means includes incident position detection means for detecting the incident position of the reflected light based on the switching position of said switching means when said output status changes.

7. A measuring distance apparatus according to claim 6 wherein said detection means includes control means for sequentially actuating and deactuating said switching means.

8. A measuring distance apparatus according to claim 7 wherein said control means includes timer means for timing the switching of said switching means.

9. A measuring distance apparatus according to claim 1 wherein said detection means includes timer means for timing the detection of the incident position of said signal light by the switching of said switching means.

10. A measuring distance apparatus according to claim 1 wherein said detection means detects the incident position of said signal light based on the position of the switching means which is in a closed position when an output current from said resistive wire connected to said detection means is substantially zero.

* * * * *